Patented July 5, 1927.

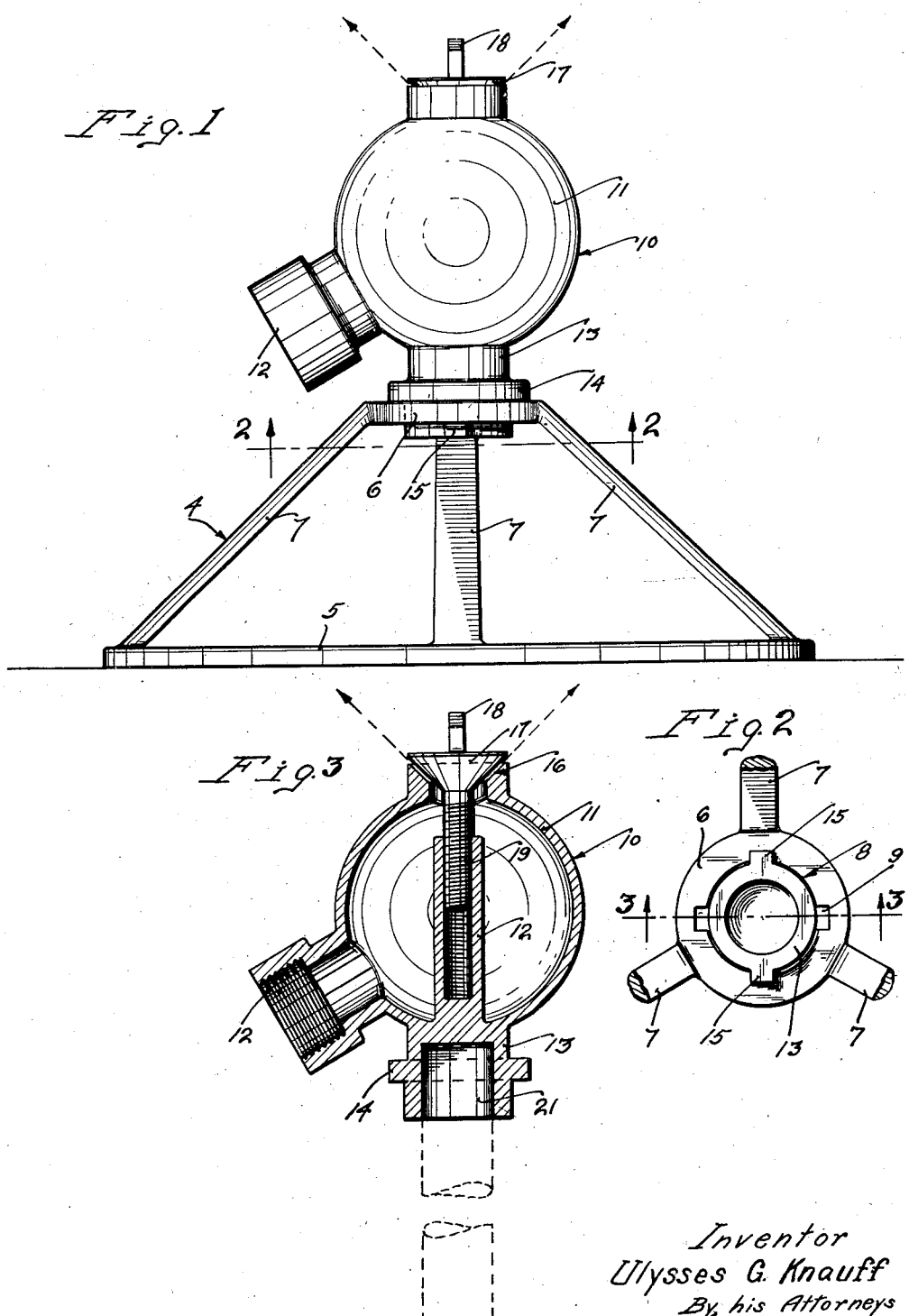

1,634,261

UNITED STATES PATENT OFFICE.

ULYSSES G. KNAUFF, OF MINNEAPOLIS, MINNESOTA, ASSIGNOR TO C. J. KNUTSON, OF PORTLAND, OREGON.

LAWN SPRINKLER.

Application filed April 15, 1926. Serial No. 102,215.

My invention provides an extremely simple and highly efficient sprinkler especially adapted for lawn and garden uses and, generally stated, it consists of the novel devices and combinations of devices hereinafter described and defined in the claim.

In the accompanying drawings, which illustrate the invention, like characters indicate like parts throughout the several views.

Referring to the drawings:

Fig. 1 is a side elevation of the complete sprinkler;

Fig. 2 is a section taken on the line 2—2 of Fig. 1; and

Fig. 3 is a section of the sprinkler head, taken on the line 3—3 of Fig. 2, with the base removed.

The base of the sprinkler is preferably made of a casting 4 having a comparatively large rim-like lower portion 5, which normally rests upon the ground, and a much smaller upper portion 6 supported by inclined legs 7 provided with a recess 8 and notches 9 to receive the lower portion of the neck of the sprinkler head.

The sprinkler head, which is indicated as an entirety by the numeral 10, comprises a central shell-like body 11 having a water-intake nipple 12 threaded to receive a hose coupling, not shown.

The under side of the main body 11 is formed with a neck 13, which, as shown in Figs. 1 and 2, may be inserted through a recess 8 in the upper portion 6 of the base 7 and is provided at its central portion with a flange or collar 14 to limit its downward movement through said recess. The neck 13, at its lower end, is provided with outstanding lugs 15 that are capable of passing through the notches 9 in said upper portion 6 of the base 4, and when said head and neck are turned, so that the lugs 15 are turned out of engagement with said notches 9, the parts will be held together.

The sprinkler head 9, at its upper extremity, is formed with an inverted conical opening 16 adapted to receive an inverted conical adjustable distributor 17. Said distributor 17, at its top, is provided with a finger piece 18 and at its lower extremity is provided with a long spindle 19 that has threaded engagement with a long internally threaded boss 20 which extends upward from the bottom of the sprayer head 10.

It should be noted that the neck 13 of the sprayer head 10 is provided with a recess 21 to accommodate the end of a garden tool or stick shown only by dotted lines.

The inverted conical adjustable distributor 17 may be screwed into or out of the inverted conical opening 16 to vary the thickness of the flow of water from a sheet so thin that it will be blown into a fine mist-like spray to as heavy a spray as the operator desires.

When my novel sprinkler is used on a lawn it is, generally speaking, preferable to use it in combination with its base 4, as shown in Fig. 1, and may be easily shifted about by pulling on the hose, without upsetting the same. When it is desired to use the sprinkler in the garden or among shrubbery, where it is not convenient to use said sprinkler in combination with the base, or when it is desired to cover a larger area, the sprinkler head 10 may be removed from its base 4 by disengagement of the bayonet joint, and a garden tool or stick of any desired length may be placed into the hole 21 in the neck 13 of said sprinkler head and inserted into the ground at its lower end. The height to which the sprinkler head is elevated is determined by the increase in area to be sprinkled.

The device above described has been found highly efficient in practice and may be manufactured at a comparatively low cost.

What I claim is:

A hollow sprinkler head having a depending socketed neck provided with an annular flange and circumferentially spaced outwardly extended lugs below said flange, said flange and lugs being integrally formed with said neck, in combination with a supporting base having in its top an opening and notches extending into said opening and through which opening and notches said neck may be inserted and rotated to interlock the lugs with the under side of the supporting base and with the flange supported on the top of said base.

In testimony whereof I affix my signature.

ULYSSES G. KNAUFF.